Nov. 19, 1968 W. C. BECKER ET AL 3,411,419
METHOD OF MAKING A CONTAINER HAVING MULTILAYER WALL MEANS
Filed Feb. 16, 1966 2 Sheets-Sheet 2
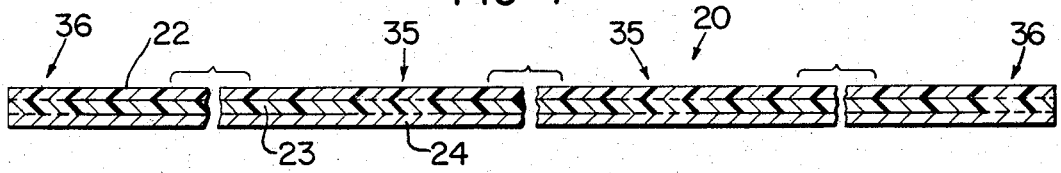
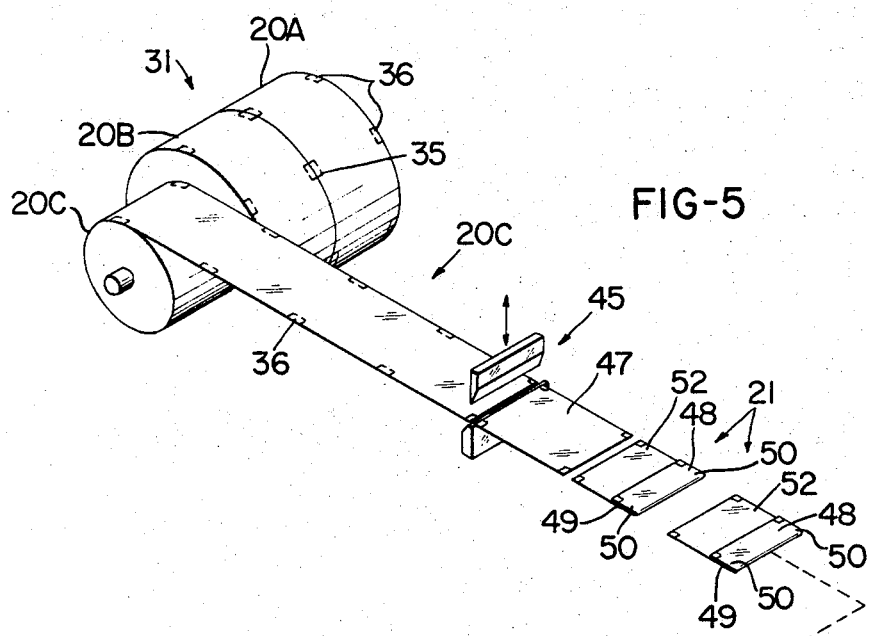
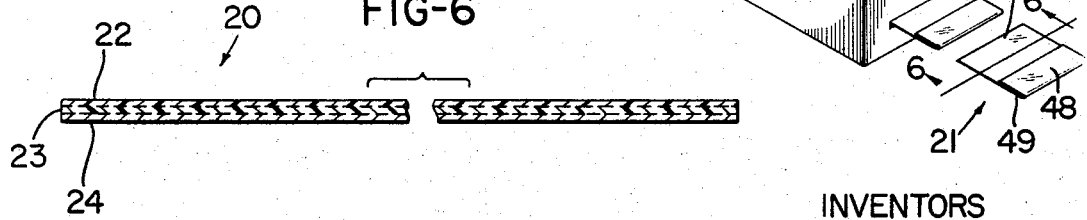
INVENTORS
WILLIAM C. BECKER
FRANK B. HART, JR.
BY Glenn, Palmer,
Matthews & Lyne
THEIR ATTORNEYS 3,411,419
METHOD OF MAKING A CONTAINER HAVING MULTILAYER WALL MEANS
William C. Becker, Henrico County, and Frank B. Hart, Jr., Richmond, Va., assignors to Reynolds Metals Company, Richmond, Va., a corporation of Delaware
Filed Feb. 16, 1966, Ser. No. 527,961
6 Claims. (Cl. 93—35)

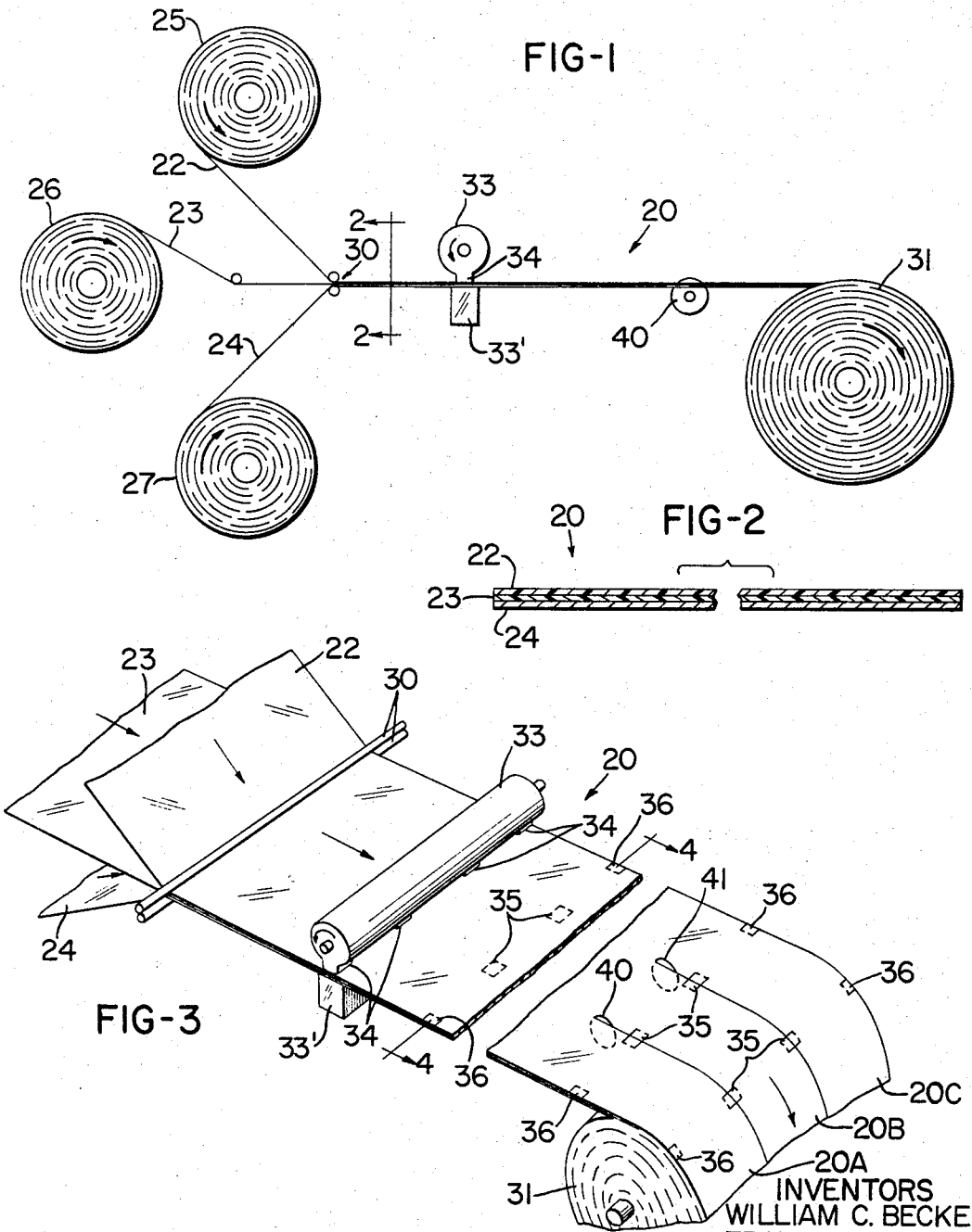

ABSTRACT OF THE DISCLOSURE

This disclosure relates to a multilayer sheet formed by tacking together a plurality of webs of material in which one of the webs is made of a heat-sealable material. The multilayer sheet is then formed to define container means, for example, which is passed through a heat environment to bond the heat-sealable web to adjoining webs whereby the completed container means has high structural strength.

---

This invention pertains to multilayer sheet means and more particularly to such sheet means made of a plurality of separate web means initially tacked together and adapted to be subsequently bonded together over their entire adjoining surface areas, to an improved method for making such sheet means, and to container means and a method for making such container means using such multilayer sheet means.

There are many packaging applications requiring the use of multilayered easily formed wall means to satisfy various combinations of packaging requirements such as structural protection, thermal protection, moisture proofing, eye appeal, decoration, etc. It is generally expensive to provide a package satisfying several of such requirements using current techniques. One of such techniques is to completely form such wall means having a plurality of webs of material bonded together as one integral unit over their entire adjoining surfaces prior to forming such package thereby making it expensive to produce such package and practically impossible to add another web or layer to the bonded sheet if it is desired to add another protective feature or decorative feature to the final package.

Accordingly, it is a feature of this invention to provide an improved multilayer sheet means comprised of a plurality of separate web means simply and inexpensively.

Another feature of this invention is to provide an improved multilayer sheet means comprised of a plurality of separate web means which are initially tacked together at a plurality of spaced apart locations sufficiently to enable handling of such web means as an integral unit enabling the formation of container means or the like therefrom, such tacked web means being adapted for bonding over their entire adjoining surface areas.

Another feature of this invention is to provide an improved multilayer sheet means which can be formed rapidly and which uses the characteristics of one of a plurality of web means provided to form such sheet means to tack such plurality of web means together while giving such sheet means sufficient rigidity and strength for handling.

Another feature of this invention is to provide an improved multilayer sheet means comprised of a plurality of separate interleaved web means in which one of the web means is formed of a heat-sealable material the characteristics of which are used to initially tack the layer means together and which necessitates only that the interleaved sheet means be subjected to a heat environment in order to become bonded to surface areas of web means adjoining such heat-sealable web means.

Another feature of this invention is to provide an improved container means having multilayer wall means in which the wall means of such container means is formed using a plurality of webs which are initially tacked together at spaced apart locations and subsequently bonded together over their entire adjoining surface areas after formation of such container means thereby providing container means having improved structural strength.

Another feature of this invention is to provide an improved method for making multilayer sheet means in which such sheet means comprises a plurality of separate web means which are interleaved and tacked together at spaced apart locations and adapted for subsequent bonding over their entire adjoining surface areas.

Another feature of this invention is to provide an improved method for forming multilayer sheet means using a plurality of web means in which any combination of web means may be interleaved in any desired arrangement and in which additional web means may be added after tacking a plurality of such web means together to define sheet means or web means may be deleted prior to tacking thereby enabling a user thereof to have maximum versatility with available web means for increased economy and operating efficiency.

Another feature of this invention is to provide an improved method for forming multilayer sheet means adapted to be used to form container means in which each of a plurality of web means comprising the multilayer sheet means is individually rolled on roll means provided therefor and such web means are interleaved by unrolling each web means in the desired interleaved manner and temporarily tacking the resulting interleaved stack together and subsequently rolling the tacked assembly on other roll means.

Another feature of this invention is to provide an improved method for forming multilayer sheet means in which a plurality of webs defining such sheet means are tacked together employing locally applied heat means.

Another feature of this invention is to provide an improved bag means formed from multilayer sheet means or web means in which the bag means is formed while the web means are merely tacked together at a plurality of spaced apart locations and the final bag structure has wall means in which the web means are bonded together over their entire adjoining surface areas.

Therefore, it is an object of this invention to provide an improved multilayer sheet means having one or more of the novel features of this invention as set forth above or hereinafter shown or described.

Another object of this invention is to provide an improved method for forming such multilayer sheet means or the like.

Another object of this invention is to provide improved container means and an improved method for forming such container means using such improved sheet means.

Other objects, uses, and advantages of this invention are apparent from a reading of this description which proceeds with reference to the accompanying drawings forming a part thereof and wherein:

FIGURE 1 is a schematic view illustrating a plurality of separate web means each carried on a separate roll, being interleaved, tacked together, slit into three equal sections, and the resulting multilayered sheet means being rolled on a final roll.

FIGURE 2 is a sectional view on the line 2—2 of FIGURE 1 showing the interleaved web means prior to their being tacked together.

FIGURE 3 is a view looking normal to the sheet means as illustrated in FIGURE 1 and particularly illustrating the manner of interleaving the separate web means together and apparatus for tacking such interleaved web means at a plurality of spaced apart locations.

FIGURE 4 is a sectional view on the line 4—4 of FIGURE 3 particularly showing by dotted lines the areas where the web means have been tacked together.

FIGURE 5 is a perspective view illustrating one of the three sections of the tacked together sheet means being unrolled from the final roll of FIGURE 1, cut in predetermined lengths, folded to form bag means, and schematically illustrating such bag means being passed through a heating oven where the tacked webs are bonded together to form bag means having an integrally bonded multilayer wall means.

FIGURE 6 is a sectional view on the line 6—6 of FIGURE 5 illustrating, by dotted lines, the plurality of webs bonded together after having passed through the heating oven of FIGURE 5.

While the various features of this invention are hereinafter illustrated and described as being particularly adaptable for providing improved multilayer sheet means and improved container means such as bags or the like using such sheet means, and to an improved method for forming or making such multilayer sheet means and such improved container means, it is to be understood that the various features of this invention can be utilized singly or in any combination thereof to provide multilayer sheet means for other uses as desired.

Therefore, this invention is not to be limited to only the embodiments illustrated in the drawings because the drawings are merely utilized to illustrate one of the wide variety of uses of this invention.

In the exemplary embodiment of this invention illustrated in FIGURES 1–6 an improved multilayer sheet means such as a multilayer sheet 20 of this invention is illustrated, as well as an improved container means such as a bag 21 made from a section of sheet 20 and illustrated in FIGURE 5, and a method for making or forming such sheet means 20 and bag 21.

As shown in FIGURE 1 of the drawings sheet 20 comprises a plurality of separate web means of material means or webs of material such as a paper web 22, a central heat-sealable web, such as polyethylene 23, and an outer web of metal foil 24. Each of the webs is separately carried in roll form on rolls 25, 26, and 27 respectively for paper web 22, polyethylene web 23 and metallic foil web 24. The webs 22–24 are of the same width and each is unwound from its respective roll and passed through a pair of combining or nip rolls 30 in an aligned manner thereby interleaving polyethylene web 23 between paper web 22 and foil web 24 in this example. The interleaved webs are tacked together at a plurality of spaced apart locations downstream of rolls 30 and in this example slit into three equal width sections. The interleaved and tacked web sections are rolled on a final combination roll 31. The tacked sheet 20 has sufficient strength to be handled as an integral unit and is adapted to be used to form container means, for example, as will be subsequently described. In addition, the construction of such sheet 20 is such that the entire adjoining surface areas of the webs 22, 23, and 24 are readily bonded together to provide an integral final sheet meeting all the desired requirements of container means formed therefrom.

The webs 22–23 in this example of the invention may be adhesively tacked together such as by using glue or any suitable adhesive means. However, in this example of the invention, the outer webs 22 and 24 are adhesively tacked to the central heat-sealable polyethylene web 23 by applying localized heat at a plurality of spaced apart locations of comparatively small areas.

Heat is applied using local heating means such as a heater bar assembly 33 having a plurality of electrical heating elements of generally rectangular outline and each designated by the numeral 34 and arranged at a plurality of spaced apart locations along assembly 33. As the interleaved webs 22–24 are passed under heater bar 33, the heating elements 34 are brought into engagement with the top paper web 22 in this illustration slightly compressing the interleaved webs between bar assembly 33 and a support plate 33' beneath the interleaved webs. The heating elements 34 apply local heating as determined by their contact areas and cause the central heat-sealable web of polyethylene 23 to adhere to the paper web 22 on one side and the metallic foil web 24 on its other side to provide the tacking actions.

The heater bar assembly 33 in this exemplary embodiment is rotated so as to bring its heater elements 34 into engagement with the interleaved webs at predetermined spaced intervals therealong as determined by the rate at which the heater bar 33 is rotated and the interleaved sheet moved thereunder. Suitable means, not shown, are employed to rotate bar assembly 33 and to provide electrical energy to elements 34.

The heater elements or heat shoes 34 are spaced along bar assembly 33 so as to divide the sheet means 20 into three sections of equal width designated by the numerals 20A, 20B, and 20C. Generally rectangular areas corresponding to elements 34 have been designated by dotted lines on sheet 20 to illustrate the locations where webs 22–24 have been adhesively tacked using the heating elements 34. The tacked areas along the mid-portion of sheet 20 have been designated by the numeral 35 while the areas along the side edges of sheet 20 have been designated by the numeral 36.

A pair of rotary knives designated by the numerals 40 and 41 is provided and such knives are arranged downstream of the heater bar assembly 33. As sheet means 20 is wound on roll 31 the knives 40 and 41 cut such sheet into the three equal width sections 20A, 20B, and 20C. Suitable means, not shown, is provided to rotate the rotary knives 40 and 41 and provide the cutting action.

The tacked areas 35 located along the mid-portion of sheet 20 of this example are preferably wider than the areas 36 along the side edges of such sheet. The rotary knives 40 and 41 are arranged to essentially bisect an associated area 35. The bisected areas 35 and areas 36 provide tacked side edges along the length of each section 20A, 20B, and 20C. It will be appreciated that the shape, area, and location of each area 35 or 36 may vary depending on the web means being tacked together. Further, it may be desired to avoid cutting through tacked areas 35 altogether, thus providing tacked areas similar to area 35 at spaced apart locations on both sides of each knife 40 and 41.

The heat-sealed areas designated by the numerals 35 and 36 are shown by dotted lines in FIGURE 4 at spaced apart locations across the width of sheet 20. The adhesive bond provided by the heating action at such spaced apart locations is sufficient to hold sheet 20 and, of course, sections 20A, 20B, and 20C thereof together as integral units enabling each section to be handled simply and effectively.

The roll 31 of this example of the invention, with its sections 20A–20C, is suitably mounted for rotation, as illustrated in FIGURE 5, and a portion thereof illustrated as strip portion 20C is unrolled therefrom. Knife means illustrated as a knife assembly 45 is used to cut strip 20C into a plurality of generally rectangular sections of predetermined lengths.

As shown in FIGURE 5 each rectangular section, designated by the numeral 47, is folded so that an end portion 48 thereof overlaps the remaining portion 49 and the overlapped portions are sealed, as by glue or other suitable means, along overlapped side edges 50 to define container means having a bag-like construction and shown as bag 21. Bag 21 has a closure flap 52 for easy closing thereof.

Means is provided for applying a heat environment to bag 21 and is illustrated in this example of the invention as oven means or an oven 53. Oven 53 causes the heat-sealable central web means or polyethylene web 23 in this example of the invention to be bonded to paper web 22 over their entire adjoining surface areas on one side of polyethylene web 23. Web 23 is also simultaneously bonded by the heating action to metallic foil web 24 over their entire adjoining surfaces.

Thus, container means or bag 21 is provided which has integral laminated sheet means or webs forming wall means thereof bonded together over their entire adjoining surface areas, thereby providing container means of improved structural strength. FIGURE 6 illustrates, by dotted lines, the central heat-sealable web 23 bonded throughout its adjoining surface areas to webs 22 and 24 on opposite sides thereof.

While in this example of the invention a plurality of three webs is shown tacked together to form sheet means 20 it will be appreciated that any number of webs may be tacked together as desired to provide a sheet means having various characteristics as determined by the various individual characteristics of the separate web means either separately or in combination. A few examples of materials which may be employed in web means to be interleaved, initially tacked and subsequently bonded include not only the paper, polyethylene, and metal foil illustrated but also waxed paper, cellophane, polypropylene, etc. Such materials may be interleaved in any desired combination or order and suitably tacked and subsequently bonded over their adjoining surface areas.

The various rolls 25, 26, 27, and 31 are shown in the drawings schematically. It will be appreciated that such rolls are supported and driven in any suitable known manner.

It will be appreciated also that the improved method of this invention enables a user to purchase various rolls of web materials and tack and bond only those specific webs and combinations as required to meet individual requirements. For example, if metal foil is used in a plurality of bonded web means for one application and not another the roll of metal foil is used only as required and then stored for later use. This method obviously reduces waste.

Thus, it is seen that improved sheet means and container means having wall means comprised of a plurality of web means initially tacked together to provide an integral structure has been provided and in which such web means are adapted to be subsequently bonded over their entire adjoining surface areas thereby providing improved structural strength.

Further, an improved method for forming such sheet means and an improved method for forming container means using such sheet means has been provided in which the container means has been given the desired characteristics by providing an economical and versatile method for selectively forming such sheet means.

While the form of the invention now preferred has been disclosed as required by statute, other forms may be used, all coming within the scope of the claimed subject matter which follows.

What is claimed is:

1. An improved method for forming container means comprising the steps of, providing a plurality of separate web means of material means, interleaving said w( means while maintaining them separate from each othe tacking said interleaved web means together at a plurali of spaced apart locations to provide an interim attachme holding said web means together to form single she means, forming said container means using said sing sheet means, and bonding said web means together, ov their entire adjoining surface areas to provide said co tainer means having improved strength and durabilit 2. The method as set forth in claim 1 in which said st( of providing a plurality of web means further compris providing each of said web means in roll form and sa interleaving step comprises unrolling each of said w( means and combining said web means through a pair cooperating roll means and rolling the combined w( means after said tacking step on final roll means.

3. The method as set forth in claim 1 in which sa step of providing a plurality of separate web means co1 prises providing at least one of said web means made of heat-sealable material, and said tacking step compris providing local heating means for applying heat over co1 paratively small areas of said interleaved web means a1 applying such local heating means at said spaced apa locations causing said heat-sealable web means to be a tached to adjoining web means at said locations.

4. The method as set forth in claim 3 in which, sa step of providing a plurality of separate web means co1 prises providing said web means of generally rectangul outline and of equal surface areas to thereby define sa single sheet means having a rectangular outline, said st of forming said container means comprises folding a te minal end portion of said rectangular single sheet mea on the remaining portion thereof and fastening along t folded opposite side edges to define bag means having cl sure flap means defined by the portion of said rectangul single sheet means extending beyond the open end said bag means.

5. The method as set forth in claim 4 in which sa bonding step comprises providing heat environment mea and passing said bag means through said heat enviro ment means to thereby bond said web means togeth over their entire adjoining surface areas.

6. The method as set forth in claim 5 in which said st( of providing local heating means comprises providing ele trical heating means and said step of providing heat e vironment means comprises providing a heating oven.

References Cited

UNITED STATES PATENTS

| 2,998,183 | 4/1961 | Rosen et al. | |
| 3,130,647 | 4/1964 | Anderson et al. | |
| 3,181,438 | 5/1965 | Leary | 93— |
| 3,261,267 | 7/1966 | Becker | 93—: |
| 3,269,278 | 8/1966 | Olstad | 156—271 |
| 3,332,324 | 7/1967 | Lehmacher et al. | 93— |

WILLIAM S. LAWSON, *Primary Examiner.*